April 23, 1968  M. D. RUTKOWSKI  3,379,634
ZERO GRAVITY ELECTROLYSIS APPARATUS

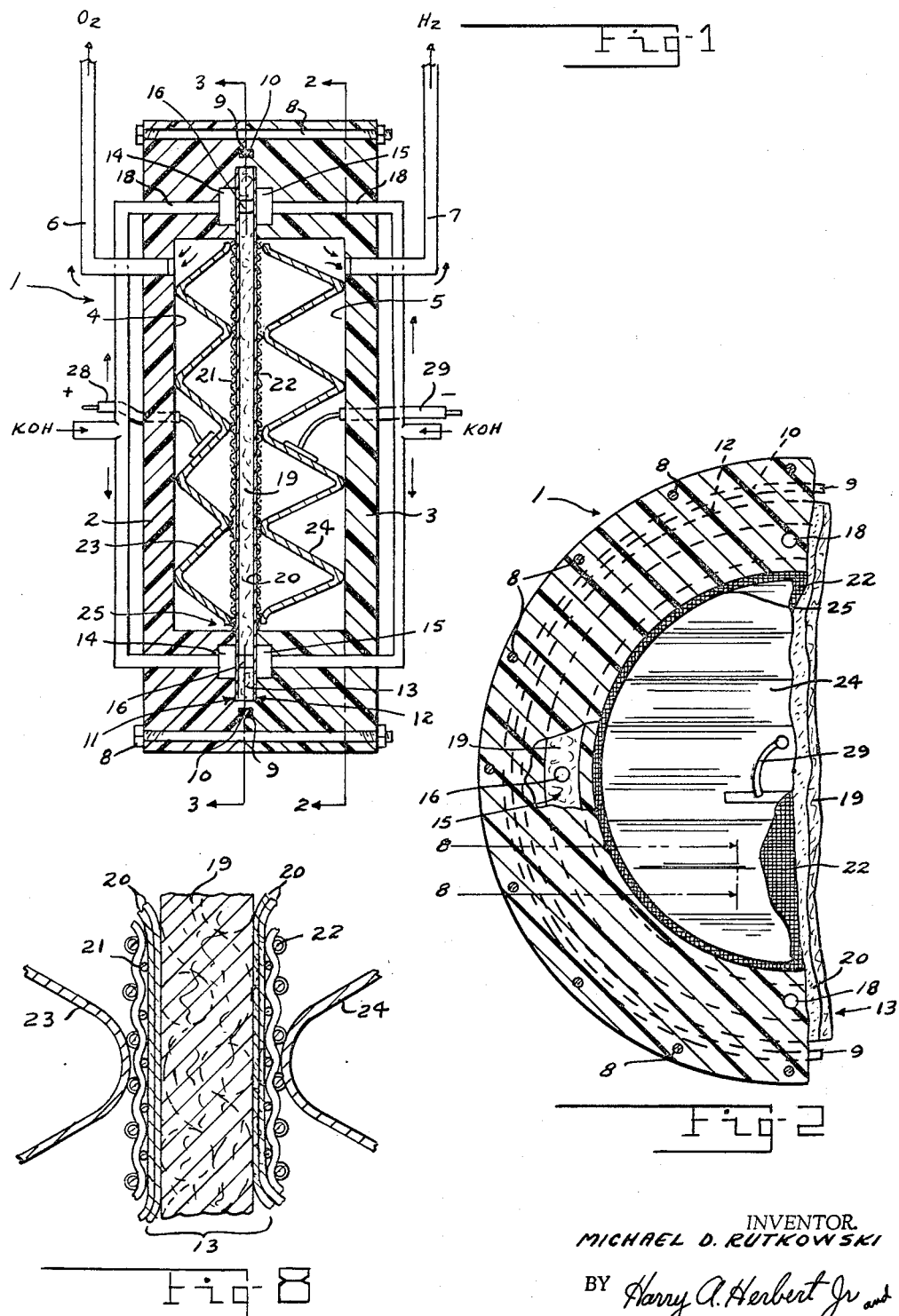

Filed May 24, 1965  4 Sheets-Sheet 2

INVENTOR.
MICHAEL D. RUTKOWSKI
BY Harry A. Herbert Jr and
Charles H. Wagner
ATTORNEYS April 23, 1968     M. D. RUTKOWSKI     3,379,634
ZERO GRAVITY ELECTROLYSIS APPARATUS
Filed May 24, 1965     4 Sheets-Sheet 3
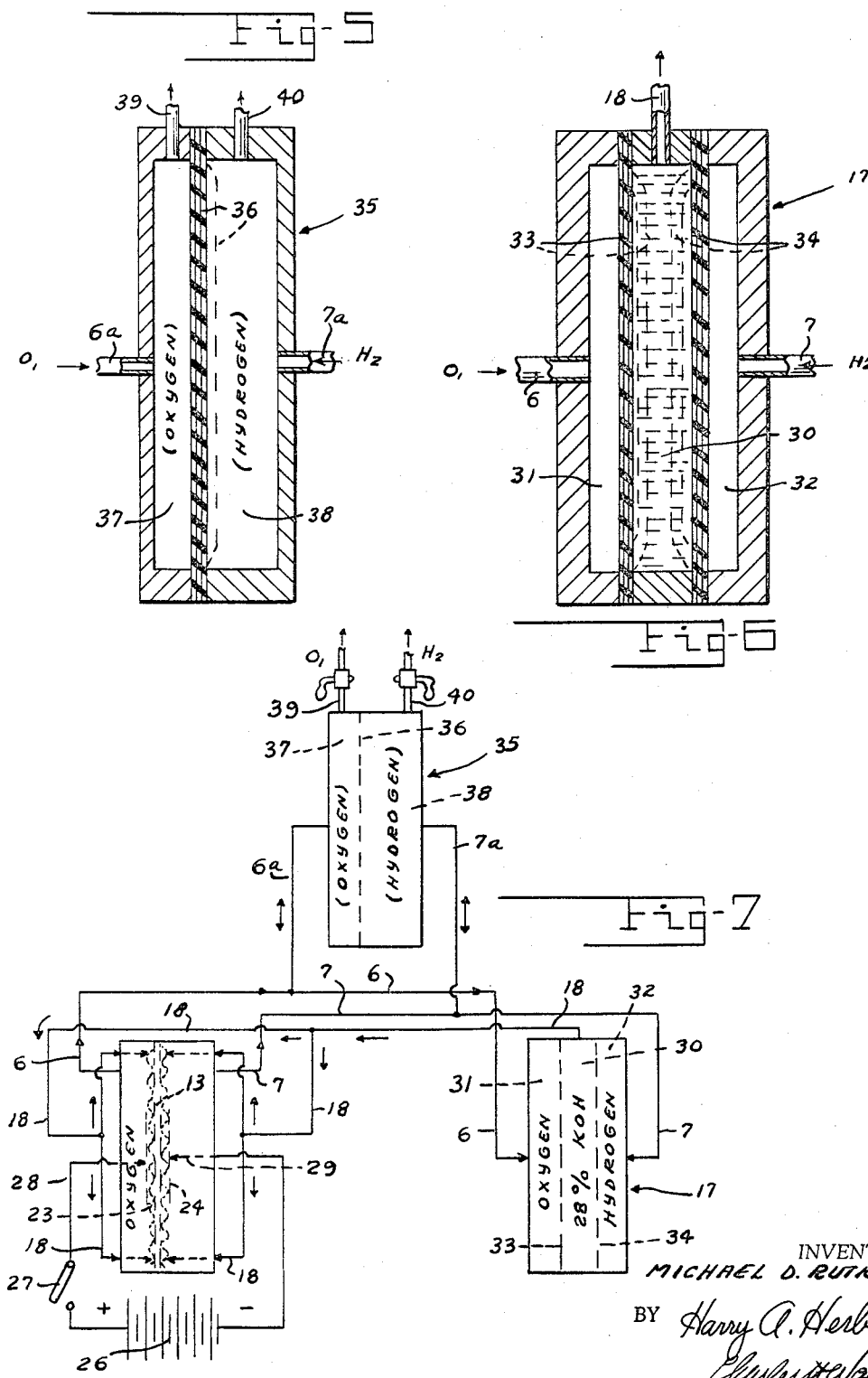
INVENTOR.
MICHAEL D. RUTKOWSKI
BY Harry A. Herbert Jr.
Charles H. Wagner
ATTORNEYS

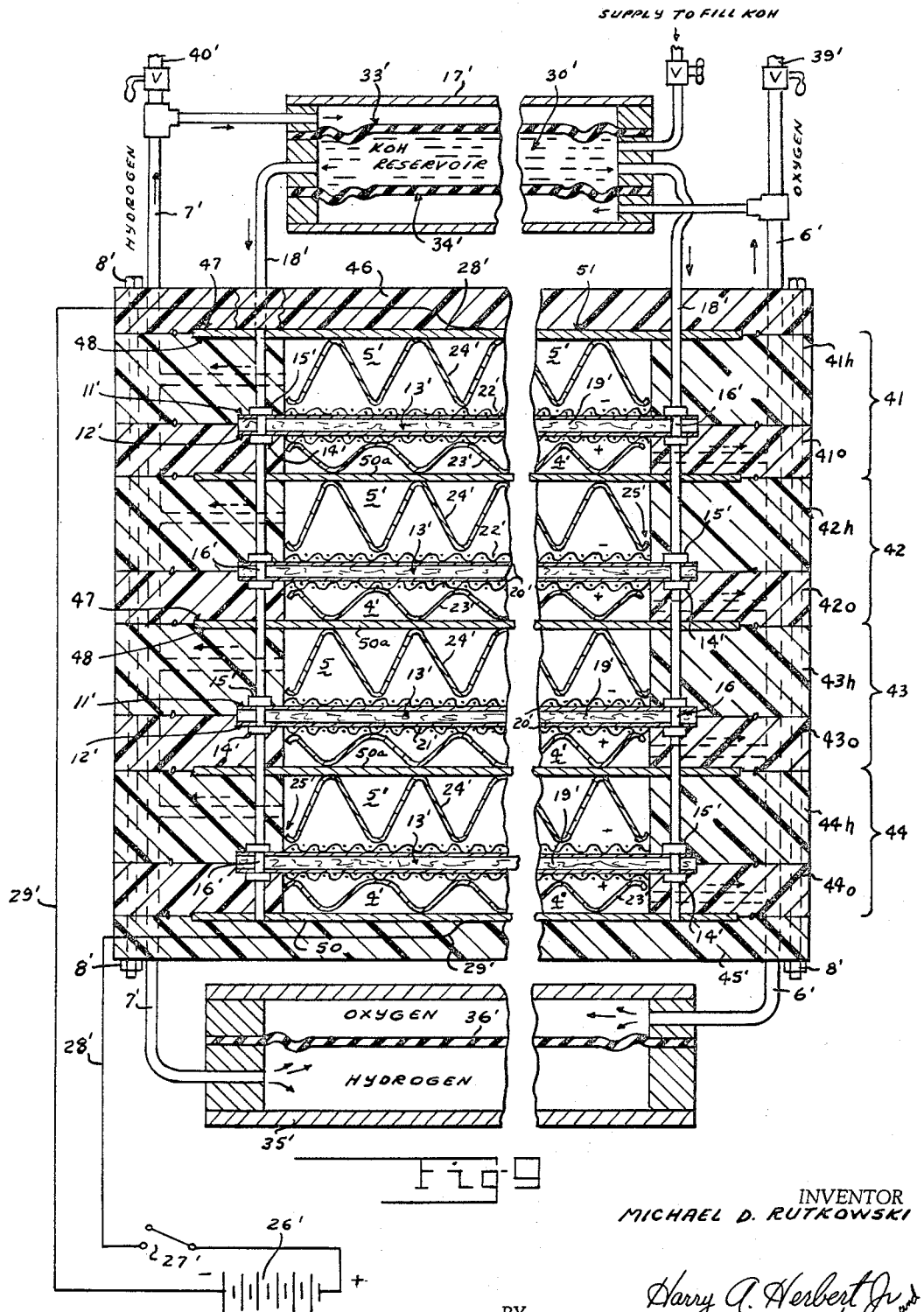

United States Patent Office 3,379,634
Patented Apr. 23, 1968

3,379,634
ZERO GRAVITY ELECTROLYSIS APPARATUS
Michael D. Rutkowski, Phoenixville, Pa., assignor to the United States of America as represented by the Secretary of the Air Force
Filed May 24, 1965, Ser. No. 458,520
19 Claims. (Cl. 204—258)

The invention described herein may be manufactured and used by or for the United States Government for governmental purposes without the payment to me of any royalty thereon.

This invention relates to improvements in apparatus for the production of oxygen and hydrogen from an aqueous electrolyte solution by electrolysis, and more particularly to apparatus which will function under zero gravity conditions, such as in "outer space," having for an object a simple and effective oxygen generator with no moving parts, including means for positively feeding the electrolyte to the generator under zero gravity conditions by the employment of equalized pressures of the gases generated by the electrolysis process.

A further object is the provision of apparatus including closed cells employing water electrolysis for production of oxygen and hydrogen under zero gravity conditions by utilizing capillary action to supply and hold the electrolyte in contact with the electrodes in the generator or cells, and delivering the electrolyte from a supply source into the cells under predetermined gaseous pressure.

A further object of the invention includes the provision of a pressure equalization chamber incorporated into the generator system to equalize the generated oxygen and hydrogen pressures on the electrolyte to supply the electrolyte from an electrolyte reservoir to the cell or cells while preventing voids from forming in the electrolyte reservoir and thus provide a continuous stream of electrolyte from an electrolyte reservoir to the electrolysis cell or cells under zero gravity conditions during operation of the apparatus.

A further object is the provision of a closed electrolysis cell having a capillary absorbent wick member disposed across the cell for receiving and absorbing the electrolyte and dividing the cell into adjacent closed oxygen and hydrogen producing or generation chambers having oxygen and hydrogen delivery outlets therein, and metallic screen electrodes in said chambers in intimate surface contact with the capillary absorbent wick member including metallic resilient electrical contact means in each of the adjacent chambers for supplying positive and negative electrical potentials to the screen electrodes in the chambers at opposite sides of the capillary absorbent wick member, while maintaining the surfaces of the screen electrodes in intimate surface contact in the chambers with substantially the entire exposed surfaces of the absorbent wick member at opposite sides thereof.

A further object of the invention is the provision of a multicell or multichamber simple and effective oxygen and hydrogen generator for producing oxygen and hydrogen by electrolysis from an electrolyte under zero gravity conditions in which a capillary wick member divides each chamber or cell into adjacent oxygen and hydrogen receiving and delivery compartments, and metallic electrode screen members extending across each compartment in substantially complete surface contact throughout with substantially the entire exposed opposite faces of the absorbent wick member, together with a substantially resilient metallic corrugated pressure plate in each compartment between the surfaces of the screen members and the walls or plates of the compartments opposite the screen members, disposed in electrical contact with the surface of the screen members throughout a substantial area thereof, for urging the screen members into intimate surface contact with the wick member or members throughout substantially the entire exposed surface area thereof, including means for establishing positive and negative electrical potentials on the corrugated plates in the compartments at opposite sides of the wick members and including a closed electrolyte receptacle in communication with said wick members responsive to equalized pressure of the gases generated by the electrolysis of the electrolyte for feeding the electrolyte to the wick members under gaseous pressure, under zero gravity conditions during operation of the generator.

A further object includes a wick member comprising an asbestos cloth or the like absorbent wick sandwiched between the screen members, with filter paper members on opposite sides thereof in contact with the screen member and adapted to be wet by the electrolyte by capillary attraction thereof, for resisting liquid leakage of the electrolyte therethrough into the chambers at opposite sides of the wick member during operation of the cells, and preventing the mixing of the gases generated in the cells at opposite sides of the wick member.

Other objects and advantages of the invention will become apparent from the following description and accompanying drawings in which like reference characters refer to like parts in the several figures, in which:

FIG. 1 is a transverse sectional view through an electrolysis cell for zero gravity use, incorporating features of the invention.

FIG. 2 is a half-sectional view through one of the cells taken at right angles to the section in FIG. 1, about on line 2—2 of FIG. 1, parts being broken away.

FIG. 5 is a transverse sectional view taken through a gas pressure equalizer chamber or cell forming a portion of the invention.

FIG. 6 is a transverse sectional view taken through an electrolyte feed or supply chamber for utilizing the equalized pressure of gases generated by the electrolysis cell for feeding or supplying the electrolyte under predetermined equal pressures to the electrolysis cell, dotted lines showing the diaphragms deflected to progressively expel the electrolyte to the electrolysis cell or cells during the operation thereof, particularly under zero gravity conditions.

FIG. 7 is a somewhat diagrammatic illustration of the system of the invention, the arrows illustrating the directions of flow of the gases and electrolyte during the operation of the device.

FIG. 8 is a somewhat schematic greatly enlarged fragmental sectional view of the wick member, screens, and corrugated metallic pressure plates, taken about on line 8—8 of FIG. 2.

FIG. 9 is a longitudinal, somewhat diagrammatically illustrated, sectional view of a multicell oxygen and hydrogen generator for use under zero gravity conditions, showing four electrolysis cells.

Figure 3:
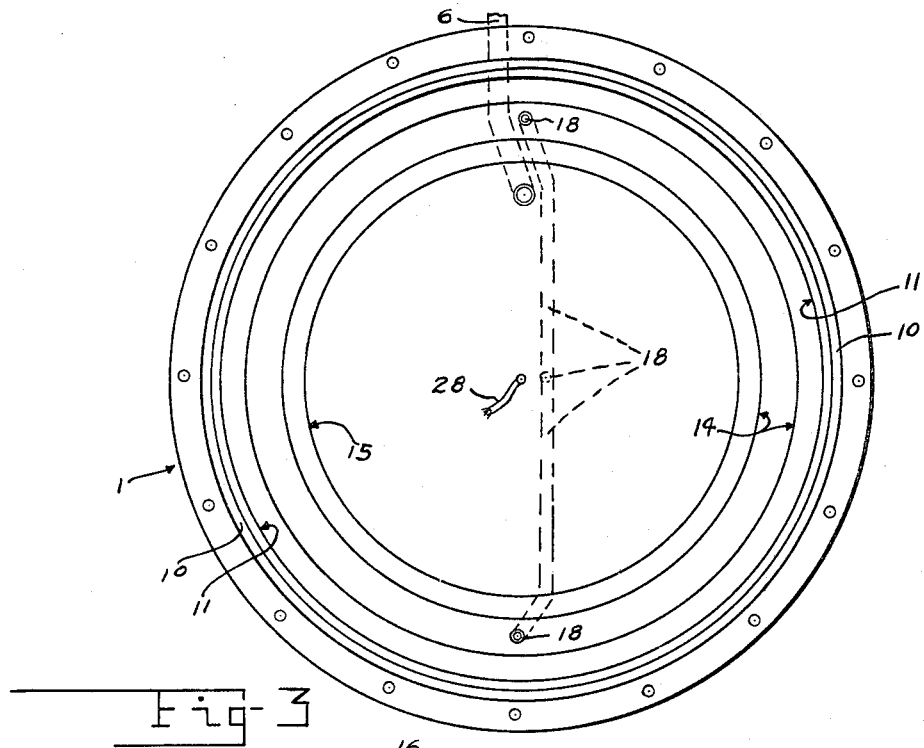
FIG. 3 is a plan view of the left-hand section of the cell shown in FIG. 1, taken about on line 3—3, looking in the direction of the arrows, but with the absorbent wick member, screen members, and corrugated pressure plates removed.
Figure 4:
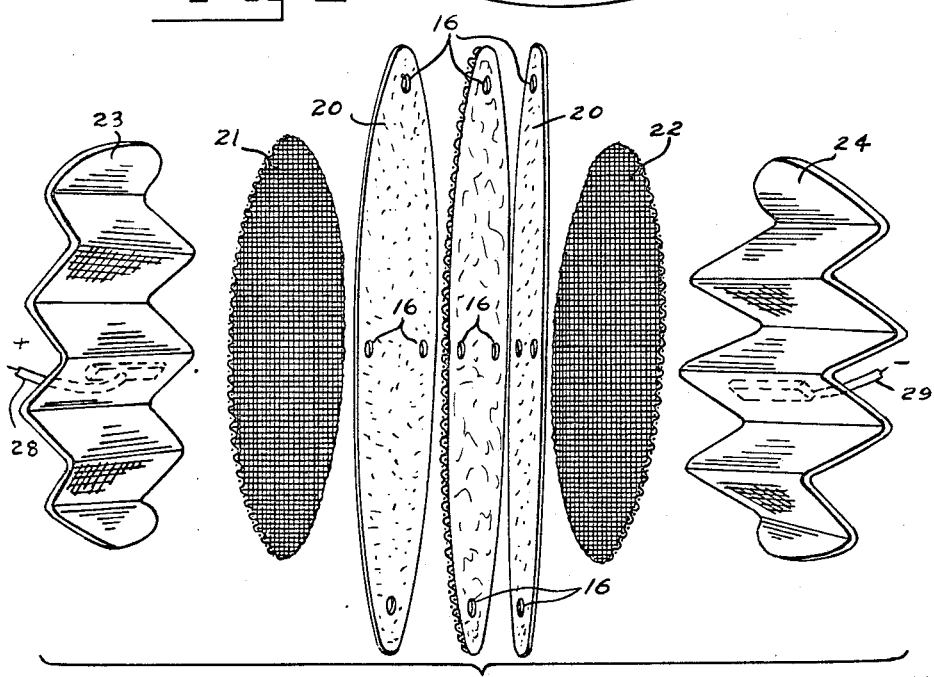
FIG. 4 is a somewhat schematic exploded view of the electrolyte absorbent wick member or disks, metallic positive and negative electropotential or cathode and anode screens and associated metallic corrugated pressure and contact plates, showing the same separated, and in perspective.

Referring to the drawings, and more particularly to FIGS. 1 to 4 and 8, the reference numeral 1 denotes generally a single oxygen and hydrogen gas producing or generating electrolysis cell, being cylindrical as shown, comprising an annular or disk-like oxygen gas generating and delivery section 2, and a hydrogen gas generating and delivery section 3, formed with closed annular chambers 4 and 5, respectively, formed with oxygen and hydrogen delivery outlets or conduits 6 and 7.

The cells 1 are preferably made of plastic or other nonelectroconductive or insulating material and secured together by any suitable means in face-to-face gas-tight condition, such as by bolts 8, as shown in the drawings. A suitable seal such as a conventional O-ring may be provided between the sections if desired, such as shown at 9, suitable O-ring receiving grooves 10 being provided in the abutting faces.

The abutting faces of the sections 2 and 3 are rabbeted as indicated at 11 and 12 to receive the annular or circular electrolyte absorbent wick member 13. The wick member 13 is in the form of a disk fitting the rabbets 11 and 12, clamped between the bottoms of the rabbets and extending across the oxygen and hydrogen chambers 4 and 5 to prevent the mixing of the generated (or released) gases in the chambers 4 and 5, as well as for feeding the electrolyte into the wick member by capillary action to keep the wick member 13 wet with a suitable electrolyte, such as 28% KOH (potassium hydroxide).

In order to accommodate the different volumes of the gases proportionally generated by the electrolysis, the hydrogen chamber or cell 5 is substantially twice the volume of the oxygen generating chamber 4. Also to assist in the distribution of the electrolyte into the wick member 13, annular electrolyte delivery channels 14 and 15 are formed in the adjacent faces of the cell sections 2 and 3 between the periphery of the rabbets 11 and 12 (and the wick member 13) and the peripheries of the chambers 4 and 5, also the wick or disk member 13 may be provided with openings or holes 16 therethrough registering with the channels 14 and 15.

The electrolyte is delivered from an electrolyte reservoir, for instance, such as diagrammatically shown in FIG. 6, and indicated at 17, to the electrolysis cell or cells 1, and more particularly to the wick members 13 through the annular channels or grooves 14 and 15 by the electrolyte delivery conduits 18.

The absorbent wick members or disks 13 each preferably comprise a membrane made of woven asbestos cloth, indicated at 19, such as commercially known "Raybestos-Manhattan Asbestos Cloth (Style 12T370 Grade AAAA)," which provide fine "wicking" properties.

The circular or disk-like wick member 13 also is preferably provided with a layer, or several layers or disks of suitable filter paper 20 which are superimposed on the opposite sides or faces of the asbestos wick disk member, such as commercially known as Whatman's No. 42 filter paper, to localize the electrolyte medium and prevent or retard the mixing of the oxygen and hydrogen gases which are generated in the chambers 4 and 5 by the electrolysis process.

Located within each of the gas generating chambers 4 and 5 on either side of the wick member 13 in substantially entire surface contact with the filter paper exposed portions are fairly close-mesh metallic electrode flat screen members or porous metallic disk electrodes 21 and 22, preferably having a diameter just fitting the peripheries of the chambers 4 and 5 and formed of suitable material such as nickel to materially resist corrosion thereof by the electrolyte in contact therewith on or through the filter paper 20 of the disk-like wick member 13.

Current is supplied to the screen electrodes 21 and 22 by fairly thin resilient corrugated metallic electroconductive pressure plates 23 and 24, of suitable material that is not materially corrosively effected by the electrolyte or the generated gases.

These corrugated electroconductive plates 23 and 24 are of circular peripheral design, but slightly smaller in diameter than the periphery of the walls of the chambers 4 and 5 to leave annular spaces 25 to permit the generated oxygen and hydrogen gases to pass around the edges thereof, and out through the delivery conduits 6 and 7. The "depth" of the corrugations is such that when the plates are clamped in the chambers 4 and 5 between the bottoms of the chambers and the screens 21 and 22, the alternate outer surfaces of the corrugations are in positive electrical contact with the screens and also exert suitable pressure on the screens toward the wick member 13 to hold the screens 21 and 22 in firm surface and electrical contact with the exposed filter paper layers 20 on the opposite sides of the absorbent asbestos cloth disk 19 and the electrolyte therein, as shown in the enlarged detail view of FIG. 8.

Suitable positive and negative electrical potential is supplied by a suitable D.C. current source or battery 26 through a suitable control means or switch 27 and electrical conductors 28 and 29 passing through the walls of the cells in sealed relation thereto, and suitably electrically connected to the respective corrugated plates 23 and 24, for instance somewhat after the manner shown in the drawings. The wire 28 provides a positive electrical potential on the screen 21 in oxygen generating chamber 4 while the wire 29 is connected to supply negative electrical potential to the screen 22 in the hydrogen generating chamber 5. Thus, the screen 21 constitutes the cathode while the screen 22 forms the anode terminal in the apparatus.

Electrolyte is supplied to the wick member 13 through the supply conduits 18 from the electrolyte supply reservoir 17, comprising a closed casing having spaced flexible diaphragms, as shown in FIG. 6, dividing the casing 17 into a central electrolyte reservoir 30 in communication through supply conduit 18 with the annular channels 14 and 15 which supply the wick 13 with the electrolyte on demand.

Pressure in the outer oxygen and hydrogen pressure chambers 31 and 32 exert pressures on the outer faces of the diaphragms 33 and 34 to expel the electrolyte and prevent voids from forming in the electrolyte chamber 30 under zero gravity conditions, suitable means (not shown), of course, being provided for filling the chamber 30 with the electrolyte.

Pressure on the outer faces of the opposite diaphragms 33 and 34 by the oxygen and hydrogen gases generated in the cell 1 is supplied through the respective oxygen and hydrogen supply conduits 6 and 7, as seen in FIG. 7, the pressures being equalized, or substantially equalized by the pressure equalizing chamber 35 having a flexible diaphragm 36 therein dividing the chamber into oxygen and hydrogen receiving pressure compartments or chambers 37 and 38, the volume of chamber 38 being about twice that of the chamber 37.

The compartments 37 and 38 are in pressure communication respectively with the outlet conduits 6 and 7 by the supply conduits 6ª and 7ª, permitting the diaphragm 36 to flex and equalize the gas pressures delivered to the chambers 37 and 38, and this equalizes the pressures on the diaphragms 33 and 34 in electrolyte reservoir 17.

The oxygen or hydrogen being used can be delivered directly to the place of use from the respective delivery conduits 6 and 7, or as schematically illustrated in FIG. 7, by valved oxygen and hydrogen outlet conduits 39 and 40.

In the operation, an electrical potential of 2.2 to about 2.6 volts is placed across the electrodes 21 and 22 through the electrolyte (28% KOH) in the wick or membrane 13. As oxygen and hydrogen gases are produced or generated, pressure builds up and the wick member or membrane 13 begins to dry out because the water of the electrolyte is dissociated. The capillary action of the woven asbestos membrane 19 and filter papers 20 draw water from the flexible electrolyte reservoir 30 between diaphragms 33 and 34 which, in turn, being compressed by gas pressures supplied from the cell 1 through the conduits 6 and 7 prevent voids from forming in the electrolyte reservoir. By preventing void formation during zero gravity conditions, a continuous stream of electrolyte from the reservoir 30 to the cell 1 is assured. Thus, the cell is built to operate independently of external gravity and has no moving parts or shiftable attachments.

In summarizing, the electrolysis cell 1 of the subject invention makes use of fine wicking qualities of woven asbestos cloth and fine filter paper to localize the electrolyte medium on the entire surfaces of the screens 21 and 22 in which these wire screen electrodes enable the evolved gases to leave the contacting electrolyte (film) medium independently of gravity, in which the screen 21 and 22 are held flat against the electrolyte medium in the wick 13 by the corrugated contact plates 23 and 24 to place substantially uniform pressures on the surfaces of the screen electrodes 21 and 22, the corrugated plates 23 and 24 also supplying the electrical potentials of positive and negative polarity to the electrodes 21 and 22.

The above description and referred to drawings set forth a single electrolysis cell arrangement for satisfactory use generating oxygen (and hydrogen), for instance, on a space craft under zero gravity conditions, while the following description taken in connection with FIG. 9, sets forth a multicell zero gravity oxygen and hydrogen generator. This disclosure illustrating somewhat schematically a four cell unit, although it should be obvious that the generator's capacity for producing oxygen and hydrogen under zero gravity conditions might be increased by increasing the number of cell units, as well as the size.

Each of the electrolysis cell units as shown at 41, 42, 43 and 44 is quite similar to the cell unit 1 shown in FIGS. 1 and 2, and all being substantially similar to each other, and therefore certain of the details will be given the same reference characters as in the single cell unit, except that they may be primed.

The multiple cell oxygen generator unit is preferably formed of plastic or other rigid insulating material and comprises end closure plates 45 and 46, and intermediate narrow and wide ring units $41^o$, $42^o$, $43^o$, $44^o$ and $41^h$, $42^h$, $43^h$ and $44^h$ suitably rabbeted at 47 and 48 to receive the flat circular metallic or electrical contact plates 50 and 51 and intermediate plates $50^a$ for supplying the relative positive and negative electrical potential from the battery 26', through switch 27' and conductors 28' and 29', to the respective contact plates 50 and 51.

The cells or rings $41^h$–$44^h$ and $41^o$–$44^o$ are rabbeted also at 11' and 12' to receive the capillary wick members 13', preferably disk shape and each composed of a center asbestos cloth disk 19' with layers of fine filter paper on each side thereof such as described previously, indicated respectively at 20'.

Electrolyte is supplied, as in the single cell form, from the electrolyte reservoir 17' under equalized pressure by the pressure equalizing chamber 35' (similar to 35 in FIG. 5) through the electrolyte supply conduits 18' to the annular channels or grooves 14' and 15' where it enters the wick members 13' through holes 16' therethrough in register with these grooves or channels 14' and 15'.

The narrower corrugated metallic electrical contact pressure plates 23' in the oxygen chambers 4' and the thicker corrugated contact pressure plates 24' in the hydrogen chambers 5', as in FIGS. 1 and 2, press the metallic screen members 21' and 22' into intimate entire surface contact with the filter papers 20' and the electrolyte therein, fed by the asbestos wick 19' by capillary action, electrical potential being established between the metal plates 50 and 51 and the respective screens 21' and 22' and intermediate plates $50a$ by the corrugated plates 23' and 24' and through the electrolyte.

Oxygen and hydrogen gases generated or released in the multiple cells 4' and 5' by the electrolysis process are discharged respectively therefrom through conduits 6' and 7' to the pressure equalization chamber or reservoir 35' and the electrolyte supply reservoir 17' as described in connection with FIGS. 5, 6 and 7.

The multiple cell unit may be bolted or clamped together in any suitable manner, such as by bolts 8' and suitable annular seals provided to prevent leakage of the electrolyte or gases from the cells, or mixing of the gases being generated.

The operation of the multiple cell unit is substantially the same as the single cell generator, positive and negative electrical potential being applied to the screens 21' and 22' through the corrugated metallic pressure plates 23' and 24' cause electrolysis of the electrolyte (KOH) in contact with the screens through the wicks 19' and filter papers 20' which, in turn, supplies pressure in the reservoir 17' to positively pressurize the electrolyte to cause the feeding thereof into the wick members 13' without interruption during the operation of the device under zero gravity, as well as any other conditions.

For example, in the electrolysis reaction, hydrogen and oxygen are produced via the following electrode reaction:

Cathode:  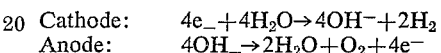
Anode:    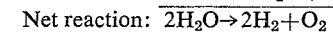

Net reaction: $2H_2O \rightarrow 2H_2 + O_2$

Since twice as much hydrogen as oxygen is produced, the chambers of the cells and pressure equalizers 35 and 35' are preferably made to receive hydrogen in twice the volume of the oxygen, for a closed system. The pressure equalizer 35, or 35', utilizes the flexible diaphragm 36, or 36', to automatically hold the volumes in a 2:1 ratio, and, as a result, the pressures on the diaphragms 33 and 34, or 33' and 34' in FIG. 9, applied to the electrolyte therebetween, are equal.

The electrolysis system is preferably initially pressurized with nitrogen to approximately 1 p.s.i. to localize the electrolyte.

As shown in FIG. 9 a D.C. electrical potential of about $10\pm$ volts is applied to the end plates 50 and 51, the positive connection being to the plate 50 while the negative connection is to the plate 51, thus current or electrons flow from the plate 51 through the corrugated pressure plates 24', 23' and intermediate wick members 13' (and sealing plates $50a$) between the cells 41–44 and the electrolyte in the wicks, to provide the respectively positive and negative potentials on the screens 21' and 22' in the oxygen and hydrogen chambers of each and all of the cells. The potential across each of the cells therefore being about 2 volts (at the desired amperage), to produce the electrolysis or decomposition of the water or electrolyte.

If desired, the multicell unit may be made of separate and independent cells, like FIG. 1, bolted or stacked together with their oxygen and hydrogen outlets connected respectively to common oxygen and hydrogen delivery conduits, but with the electrical connections made directly and individually to each of the cathode and anode screen members of each cell.

For purpose of exemplification two particular embodiments of the invention have been shown and described to the best understanding thereof. However, it will be apparent that changes and modifications in the arrangement and construction of the parts thereof may be resorted to without departing from the true spirit and scope of the invention as defined in the accompanying claims.

I claim:

1. An electrolysis device for generating oxygen and hydrogen gases from an electrolyte under zero gravity conditions comprising, a closed casing, an electrolyte absorbent wick member extending across the interior of the casing dividing the same into closed oxygen and hydrogen collection and delivery chambers at opposite sides of said wick member, means for supplying an electrolyte to said wick member under pressure for capillary saturation of the wick member and the opposite sides thereof, metallic cathode and anode fine mesh screen electrode members in substantially entire surface contact with the opposite exposed sides of said wick member respectively in said oxygen and hydrogen collection and delivery chambers, a corrugated metallic electrical contact pressure plate in each of said chambers with the corrugations thereof alternately in electrical contact with the surface of the screen members throughout substantially the area thereof, and in contact with the bottom surfaces of the chambers for urging the screen members toward the wick member and holding the screen members flat in substantially complete surface contact with the opposite sides of the wick member and the electrolyte therein, means for supplying positive and negative electrical potentials to said anode and cathode screen members in said oxygen and hydrogen collection and delivery chambers, and oxygen and hydrogen delivery outlets in said oxygen and hydrogen collection and delivery chambers for the delivery of oxygen and hydrogen therefrom during the operation of the device.

2. In an electrolysis device for generating oxygen and hydrogen from an electrolyte under zero gravity conditions comprising, a cylindrical casing having a cylindrical closed chamber therein, a circular disk of electrolyte liquid absorbent material fixed across said closed chamber, dividing the chamber into separate closed oxygen and hydrogen cylindrical chambers, means for feeding an electrolyte into said wick member at points adjacent the periphery thereof for saturating said absorbent disk member and the opposite surfaces thereof with said electrolyte by capillary action, circular flat relatively fine mesh metallic screen electrode members fitting said cylindrical chambers in substantially complete surface contact with the opposite sides of said absorbent disk member and the electrolyte at the surfaces thereof, circular electroconductive resilient pressure plates concentrically disposed in said chambers in closely spaced relation to the periphery of the chambers having a parallel zigzag corrugated formation extending between the bottoms of chambers and substantially the entire surfaces of the screen members in electrical contact therewith for holding the screen members flat in entire surface electrical contact with the entire outer surfaces of the absorbent disk members and the electrolyte thereon, and means extending into said chambers in sealed electrical contact with said plates for establishing a positive electrical potential on said screen electrode in said oxygen chamber and a negative electrical potential on said screen electrode in said hydrogen chamber during the operation of said device, a closed electrolyte supply reservoir having spaced parallel flexible diaphagms extending across said reservoir forming an intermediate electrolyte reservoir and closed oxygen and hydrogen pressure chambers at the opposite outer sides of the spaced diaphragms for flexing the diaphragms toward each other to feed the electrolyte therebetween from said electrolyte reservoir to said absorbent disk members, including conduit means connected from said oxygen and hydrogen cylindrical chambers to said oxygen and hydrogen pressure chambers, and means for equalizing the oxygen and hydrogen pressures in said closed pressure chambers during the operation of the device.

3. Apparatus as set forth in claim 2 in which the operative volume of the cylindrical hydrogen chamber is substantially twice the operative volume of the cylindrical oxygen chamber.

4. An electrolysis device for generating and delivering oxygen and hydrogen therefrom under some pressure under zero gravity conditions comprising, a closed casing having a closed oxygen collection chamber in one side thereof and a closed hydrogen collection chamber of twice the volume of the oxygen chamber in the other side thereof, including an electrolyte absorbent wick partition member between said chambers, means for supplying an electrolyte by capillary action to saturate the wick partition member including the opposite surfaces thereof, an electrolyte reservoir connected for supplying an electrolyte to the peripheral portion of said wick member for capillary diffusion therethrough comprising a closed casing having spaced parallel flexible diaphragms therein forming a closed electrolyte reservoir therebetween, and spaced closed oxygen and hydrogen pressure chambers at the outer sides of the diaphragms for displacing the diaphragms inwardly toward each other to feed an electrolyte therebetween into the wick member, a flat metallic electrode screen member in each of said closed oxygen and hydrogen collection chambers in surface contact respectively with the entire opposite surfaces of the wick member, means in each of said oxygen and hydrogen collection chambers for retaining said screen members in intimate entire surface contact with the opposite surfaces of said wick member and establishing positive electrical potential on the screen member in said oxygen collection chamber and a negative electrical potential on said screen member in said hydrogen collection chamber, and oxygen and hydrogen delivery conduit means respectively connected between the oxygen and hydrogen collection chambers and the oxygen and hydrogen pressure chambers for pressurizing both of said diaphragms toward each other to feed the electrolyte therebetween to the wick member during the operation of the device.

5. An electrolysis device for generating oxygen and hydrogen gases by electrolysis from an electrolyte under zero gravity conditions comprising, a closed cylindrical casing having cylindrical oxygen and hydrogen collection and delivery chambers in the opposite sides thereof in which the volume of the oxygen collection and delivery chamber is half the volume of the hydrogen collection and delivery chamber, a porous woven capillary wick member completely separating said oxygen and hydrogen chambers, fine mesh metallic anode and cathode flat screen members disposed respectively in said oxygen and hydrogen collection and delivery chambers for surface contact with the entire opposite surfaces of the wick member exposed in said chambers, means for retaining said screen members in entire surface contact with said surfaces of the wick member during operation of the device, a closed electrolyte reservoir having a pair of spaced parallel flexible diaphragms extending across said electrolyte reservoir and movable toward each other to feed an electrolyte for the electrolysis action therefrom, conduit means connected between said electrolyte reservoir and said wick member adjacent the periphery thereof for feeding the electrolyte into said wick member for capillary saturation thereof, and conduit means between each of said oxygen and hydrogen collection and delivery chambers and the electrolyte reservoir at the opposite outer sides of the flexible diaphragms therein for pressurizing the diaphragms inwardly toward each other by the generated oxygen and hydrogen gas pressures, means for equalizing the oxygen and hydrogen pressures at the opposite outer surfaces of the spaced diaphragms, and means for supplying a positive electrical potential to the screen member in the oxygen collection and delivery chamber and supplying a negative electrical potential to the screen member in the hydrogen collection and delivery chamber during the operation of the device.

6. Apparatus for supplying oxygen and hydrogen by electrolysis action from an electrolyte under zero gravity conditions comprising, a pair of cylindrical oxygen and hydrogen collection and delivery sections formed with cylindrical oxygen and hydrogen collection and delivery chambers therein facing each other, a liquid electrolyte absorbent disk-like wick member between and separating said chambers, exposing a circular portion of the opposite surfaces of the wick member in each of said chambers, a circular flat fine mesh metallic screen electrode disk member in each chamber in intimate surface contact with the entire exposed opposite faces of the wick member in the chambers, means for feeding an electrolyte into said wick member for capillary saturation of the opposite exposed surfaces thereof, and means for supplying a positive electrical potential to screen member in said oxygen collection and delivery chamber and a negative electrical potential to said screen member in said hydrogen collection and delivery chamber.

7. Apparatus as set forth in claim 6 in which said electric potential supplying means each comprise an annular corrugated metallic plate fitting said chambers in closely spaced relation having zigzag parallel corrugations alternately extending between and contacting the surface of the metallic screens in a plurality of points throughout and contacting the bottoms of the chambers at a plurality of points throughout, for retaining the screen members in flat surface contact with the surfaces of the wick members throughout the exposed areas thereof.

8. Apparatus as set forth in claim 7 in which the electrolyte feeding means comprises a closed electrolyte receptacle having spaced parallel flexible diaphragms across the interior thereof for receiving and containing an electrolyte therebetween for the electrolysis action, an electrolyte delivery conduit in communication between the space between the diaphragms and the absorbent wick member, and conduit means between the delivery and collection chambers and the electrolyte receptacle between the opposite walls thereof and the spaced diaphragms for pressurizing the diaphragms inwardly toward each other during the operation of the device under zero gravity conditions, for feeding the electrolyte from between the spaced diaphragms to the wick member by the oxygen and hydrogen pressures delivered from the collection and delivery chambers.

9. Apparatus as set forth in claim 8, including closed oxygen and hydrogen pressure equalizing chambers comprising a casing having a flexible diaphragm between the opposite walls thereof, dividing said casing into a closed oxygen receiving portion and a closed hydrogen receiving portion, and separate conduit means establishing communication between the oxygen receiving portion and said oxygen collection and delivery chamber, and between said hydrogen receiving portion and said hydrogen collection and delivery chamber.

10. Apparatus as set forth in claim 9 in which the volume of said hydrogen collection and delivery chamber and said hydrogen receiving portion is substantially twice the volume of said oxygen collection and delivery chamber and said oxygen receiving portion.

11. An electrolysis cell for supplying oxygen and hydrogen by electrolysis action from an electrolyte under zero gravity conditions which comprises, a pair of electro-nonconductive oxygen and hydrogen collection and delivery sections formed respectively with oxygen and hydrogen collection and delivery chambers therein facing each other, a liquid electrolyte absorbent wick member sandwiched between the sections comprising a woven asbestos cloth center wick portion and fine filter paper layers covering the opposite exposed faces of the center wick portion for absorbing the electrolyte from the center portion and retarding any mixing of released oxygen and hydrogen between the chambers, a flat metallic fine mesh screen member fitting each of said chambers in entire surface contact respectively with the entire opposite exposed surfaces of the wick member in said chambers, a corrugated metallic plate member disposed in each of said chambers circumferentially closely spaced from the annular walls of the chambers having zigzag corrugations alternately in resilient electrical contact with the screen members at spaced points thereon throughout the surface thereof for maintaining the screen members in entire intimate surface contact with the entire exposed opposite surfaces of the wick member with the intermediate corrugations in resilient contact with the bottoms of the chambers, electrical conductor means extending in sealed relation into said oxygen and hydrogen collection and delivery chambers connected for establishing a positive electrical potential on said corrugated plate in the oxygen collection and delivery chamber, and establishing a negative electrical potential on said corrugated plate in said hydrogen collection and delivery chamber, and oxygen and hydrogen delivery conduits in communication respectively with said oxygen and hydrogen collection and delivery chambers for delivering oxygen and hydrogen respectively from said chambers.

12. Apparatus as set forth in claim 11 in which the hydrogen collection and delivery chamber is substantially twice the volume of the oxygen collection and delivery chamber.

13. A multicell apparatus for producing oxygen and hydrogen by electrolysis from an electrolyte under zero gravity conditions comprising, a plurality of pairs of ring members disposed in face-to-face sealed contacting relation, each pair comprising an oxygen and hydrogen producing cell, an impervious partition plate sandwiched between each pair of cells, an impervious closure plate for closing the outer faces of the opposite outer ring members, an electrolyte absorbent wick partition member sandwiched between the rings of each pair for dividing each of the cells into an oxygen collection and delivery chamber on one side of the absorbent wick partition member and a hydrogen collection and delivery chamber at the opposite side of the absorbent wick member electrolyte conduit means in communication with the wick members for simultaneously feeding an electrolyte into the absorbent wick members for electrolyte saturation thereof by capillary attraction, flat fine mesh metallic screen members substantially coextensive in area with the exposed opposite surfaces of the wick members within the ring members, means for holding the screen members flat in intimate surface contact with the exposed opposite surfaces of the wick members in the cells including means for establishing a relative positive electrical potential on the screen members in the oxygen collection and delivery chambers of the cells, and establishing a relative negative electrical potential on the screen members in the hydrogen collection and delivery chambers of the cells, a closed electrolyte reservoir, positive electrolyte displacement means in said reservoir for simultaneously feeding an electrolyte from said reservoir under pressure into the absorbent wick members in all of said cells, to be absorbed by the wick members for saturating the opposite surfaces of the wick members in the respective oxygen and hydrogen collection and delivery chambers.

14. Apparatus as set forth in claim 13 in which said positive displacement means comprises a closed reservoir, spaced flexible diaphagm in said reservoir adapted to receive an electrolyte therebetween, and a first pressure conduit connected between the oxygen collection and delivery chambers of the cells and the interior of the closed reservoir at one side of one of the diaphragms therein and a second pressure conduit means between the hydrogen collection and delivery chambers of the cells and the closed reservoir at the opposite side of the other diaphragm, for deflecting the diaphragms inwardly toward each other to feed the electrolyte therefrom into the wick members.

15. A multicell apparatus for producing oxygen and hydrogen from an electrolyte by electrolysis under zero gravity conditions comprising a plurality of pairs of parallel hollow sections disposed in face-to-face contiguous relation to form a plurality of side-by-side contiguous oxygen and hydrogen collection and delivery cells, an impervious metallic plate member between each of the cells, an electrolyte absorbent wick partition member sandwiched between the sections of each cell dividing the cells into adjacent oxygen and hydrogen collection and delivery chambers, means for simultaneously feeding an electrolyte into the wick members under zero gravity conditions for capillary saturation of the wick member and the opposite surfaces thereof, a flat porous metallic electrode member in each of said chambers in substantially entire surface contact with each of the opposite exposed surfaces of the wick member in the cell, means for simultaneously supplying a relatively positive electrical potential to the flat metallic porous electrode members in the oxygen collection and delivery chambers and supplying a relatively negative electrical potential to the flat porous electrode members in the hydrogen collection and delivery chambers, said apparatus having oxygen delivery conduit means connected to all of said oxygen collection and delivery chambers and hydrogen delivery conduit means connected to all of said hydrogen collection and delivery chambers.

16. A multicell apparatus for producing oxygen and hydrogen from an electrolyte by electrolysis under zero gravity conditions comprising a plurality of pairs of parallel hollow nonelectroconductive sections disposed in face-to-face contiguous relation to form a plurality of side-by-side oxygen and hydrogen collection and delivery cells, an impervious electroconductive plate member between each pair of said cells, an electrolyte absorbent wick partition member clamped between the adjacent sections of each pair, dividing each of the cells into oxygen and hydrogen collection and delivery chambers at opposite sides of the wick member, an electrolyte supply reservoir, means connected thereto for feeding an electrolyte for the electrolysis action into the wick member under zero gravity condition to saturate the wick member and the opposite faces thereof by capillary action, a flat metallic close-mesh electrode screen member in each of said chambers in intimate full surface contact with the opposite surfaces of each of the wick members and the electrolyte on the surfaces thereof, a stiff metallic corrugated electroconductive pressure plate in each of said chambers between the screen member in the cell and the said impervious electroconductive plate members having deep parallel zigzag corrugations disposed alternately in electrical contact with the surface of the electrode screen members and with the surface of the impervious electroconductive plate members for holding the flat surfaces of the screen members in intimate electrical contact with the surfaces of the wick members and establish electrical contact between the impervious electroconductive plate members and the screen members, and a D.C. energizing circuit including means for establishing a relatively positive D.C. electrical potential on the electroconductive plates in contact with the corrugated pressure plates in the oxygen collection and delivery compartments of the cells and a relatively negative electrical D.C. potential on the pressure plates in the hydrogen collection and delivery cells, and conduit means connected to the oxygen collection and delivery chambers for delivering oxygen therefrom, and conduit means connected to the hydrogen collection cells for delivering hydrogen from the hydrogen collection and delivery chambers.

17. Apparatus as set forth in claim 16 in which each of said wick members comprises a woven asbestos disk and fine filter paper on the opposite sides thereof, and said electroconductive plate members comprise metallic substantially circular thin resilient deep zigzag corrugated plates with the corrugations alternately in electrical contact across the screen members from side-to-side thereof and with the impervious electroconductive plates between the cells.

18. Apparatus as set forth in claim 17 in which the hydrogen collection and delivery chambers are substantially twice the volume of the oxygen collection and delivery chambers in the cells.

19. A zero gravity oxygen producing apparatus comprising a hollow casing, a capillary wick member extending completely across the interior of the casing dividing the same into an oxygen producing chamber at one side of the wick member and a hydrogen producing chamber at the opposite side of the wick member, means for feeding an "electrolysis" electrolyte into said wick member of capillary saturation of the opposite sides thereof, a metallic flat electrode screen member in each of said chambers, constituting cathode and anode members in intimate surface contact with the entire exposed opposite surfaces of the wick member in said chambers, a metallic pressure plate fixed in each chamber in electrical contact with the screen members for holding the screen members in intimate electrical surface contact with the exposed opposite surfaces of the wick member in the chambers, and means for establishing a positive electrical potential on the pressure plate in the oxygen producing chamber and a negative electrical potential on the pressure plate in the hydrogen producing chamber for producing electrolysis of the electrolyte at the surfaces of the wick members in said chambers in contact with said screen members.

References Cited

UNITED STATES PATENTS

| | | | |
|---|---|---|---|
| 2,997,517 | 8/1961 | Ciarlariello | 136—160 XR |
| 3,120,085 | 8/1963 | Edwards et al. | 204—128 |
| 3,220,937 | 11/1965 | Friese et al. | 204—129 |
| 3,242,059 | 3/1966 | Cottam et al. | 204—266 |
| 3,282,834 | 11/1966 | Justi et al. | 204—129 XR |

HOWARD S. WILLIAMS, *Primary Examiner.*

D. R. JORDAN, *Assistant Examiner.*